United States Patent [19]

Junkers

[11] Patent Number: 5,538,379
[45] Date of Patent: Jul. 23, 1996

[54] MECHANICAL TENSIONER FOR AND METHOD OF ELONGATING AND RELAXING A STUD AND THE LIKE

[76] Inventor: John K. Junkers, 7 Arrowhead La., Saddle River, N.J. 07540

[21] Appl. No.: 388,746

[22] Filed: Feb. 15, 1995

[51] Int. Cl.$^6$ .............................. F16B 37/08; F16B 27/00
[52] U.S. Cl. ........................... 411/432; 411/403; 411/917
[58] Field of Search .................................. 411/427, 428, 411/432, 402, 403, 916, 917

[56] References Cited

U.S. PATENT DOCUMENTS

| | | | |
|---|---|---|---|
| 5,137,408 | 8/1992 | Junkers | 411/432 |
| 5,152,649 | 10/1992 | Popp | 411/917 X |
| 5,253,967 | 10/1993 | Orban et al. | 411/432 |
| 5,318,397 | 6/1994 | Junkers | 411/432 |
| 5,341,560 | 8/1994 | Junkers | 411/432 X |

Primary Examiner—Neill R. Wilson
Attorney, Agent, or Firm—Michael J. Striker

[57] ABSTRACT

A mechanical tensioner for elongating and relaxing a stud having an axis and arranged in an object, comprises at least two parts including a first part connectable with a stud to pull the stud in an axial direction so as to elongate the stud and thereby to tension it in an object or to relax the stud, a second part connected with the first part movably in a transverse direction relative to the first part, and a friction element arranged between the first part and the second part and connected with the first part immovably in a transverse direction relative to the first part. The second part has a first engaging element engageable by a tool, while the friction element has a second engaging element engageable by a tool so that when an active force is applied to the second part through the first engaging element and an opposite holding force is applied to the friction element through the second engaging element the second part moves in a transverse direction and the first part moves only in an axial direction so as to elongate or to relax the stud.

10 Claims, 1 Drawing Sheet

MECHANICAL TENSIONER FOR AND METHOD OF ELONGATING AND RELAXING A STUD AND THE LIKE

BACKGROUND OF THE INVENTION

The present invention relates to a mechanical tensioner for elongating and relaxing a stud and the like in an object such as for example a flange and the like, as well as to a method of elongating and relaxing a stud.

Mechanical tensioners of the above mentioned general type are known in form, for example, of a mechanical nut which has two elements movable relative to one another in opposite axial directions to elongate or relax a stud. There are however many applications where no gaskets are used to seal the two flange portions or where the stud is oversized relative to the required clamping force. Therefore, with a steel-to-steel flange connection there is no compression feasible, and with an oversized stud there is no stud elongation feasible, and thus axial movement of one of the parts becomes possible.

The disadvantages of the above described prior art are eliminated in my U.S. Pat. Nos. 5,318,397 and 5,341,560. It is believed that further modifications of the mechanical tensioners and method of elongating and relaxing a stud disclosed in my patents are desirable.

SUMMARY OF THE INVENTION

Accordingly, it is an object of the present invention to provide a mechanical tensioner for and a method of elongating and relaxing a stud and the like, which is a further modification of the mechanical tensioners and methods disclosed in my above identified patents.

In keeping with these objects and with others which will become apparent hereinafter, one feature of the present invention resides, briefly stated, in a mechanical tensioner for elongating and relaxing a stud having an axis and arranged in an object, which has at least two parts including a first part connectable with a stud to pull the stud in an axial direction so as to elongate the stud and thereby to tension it in an object or to relax the stud, a second part connected with the first part movably in a transverse direction relative to the first part, and a friction element arranged between the first part and the second part and connected with the first part immovably in a transverse direction relative to the first part, the second part having first engaging means engageable by a tool, while the friction element has second engaging means engageable by a tool so that when an active force is applied to the second part through the first engaging means and an opposite holding force is applied to the friction element through the second engaging means the second part moves in a transverse direction and the first part moves only in an axial direction so as to elongate or to relax the stud.

It is another object of the present invention to provide a method of elongating and relaxing the stud which comprises the steps of having an axis and arranged in an object, comprising the steps of connecting a first part with the stud to pull the stud in an axial direction so as to elongate the stud and thereby to tension it in the object and to relax the stud, connecting a second part with the first part so that the second part is movable in a transverse direction relative to the first part, arranging a friction element between the first part and the second part, providing on the second part first engaging means engageable by a tool, providing on the friction element second engaging means engageable by a tool, applying an active force to the second part through the first engaging means, and applying an opposite holding force to the friction element through the second engaging means so that the second part moves in a transverse direction while the first part moves only in an axial direction so as to elongate or to relax the stud.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing the mechanical tensioner in accordance with the present invention of FIG. 1 in a position in which an active force is applied to the mechanical tensioner for elongating and relaxing a stud and the like.

DESCRIPTION OF THE PREFERRED EMBODIMENTS

Figure 1:
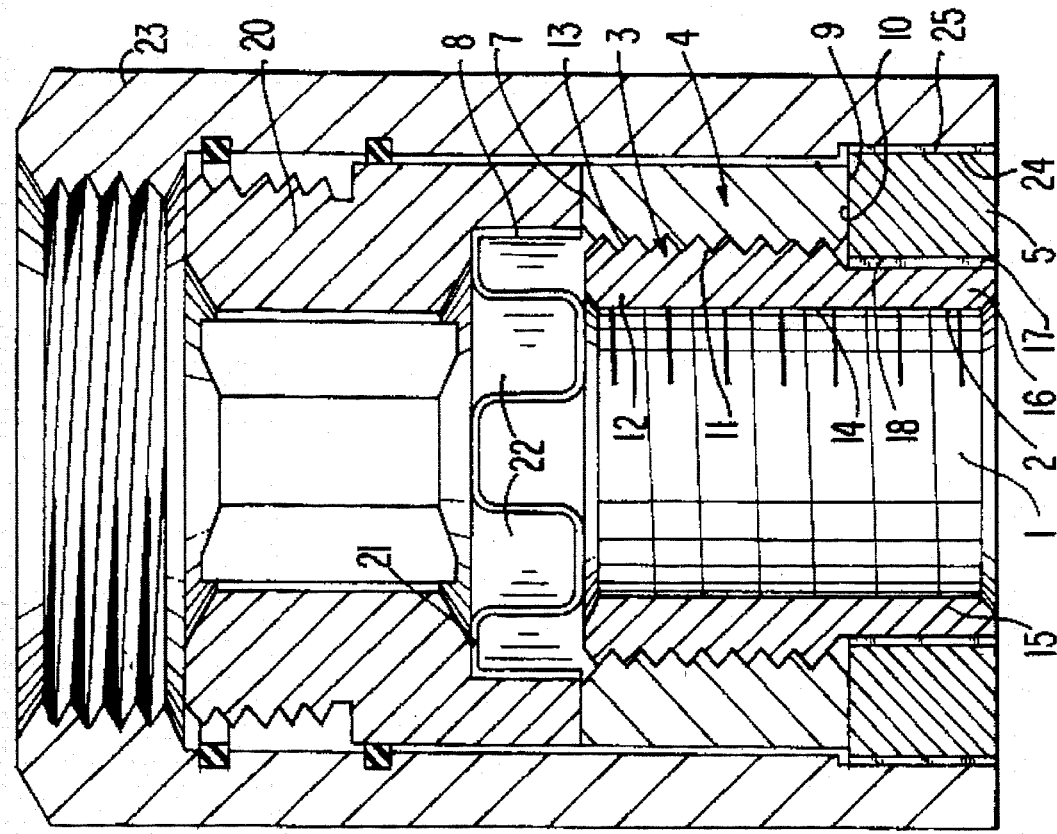
FIG. 1 is a view showing a mechanical tensioner for elongating and relaxing a stud in accordance with the present invention in an initial position.
Figure 2:
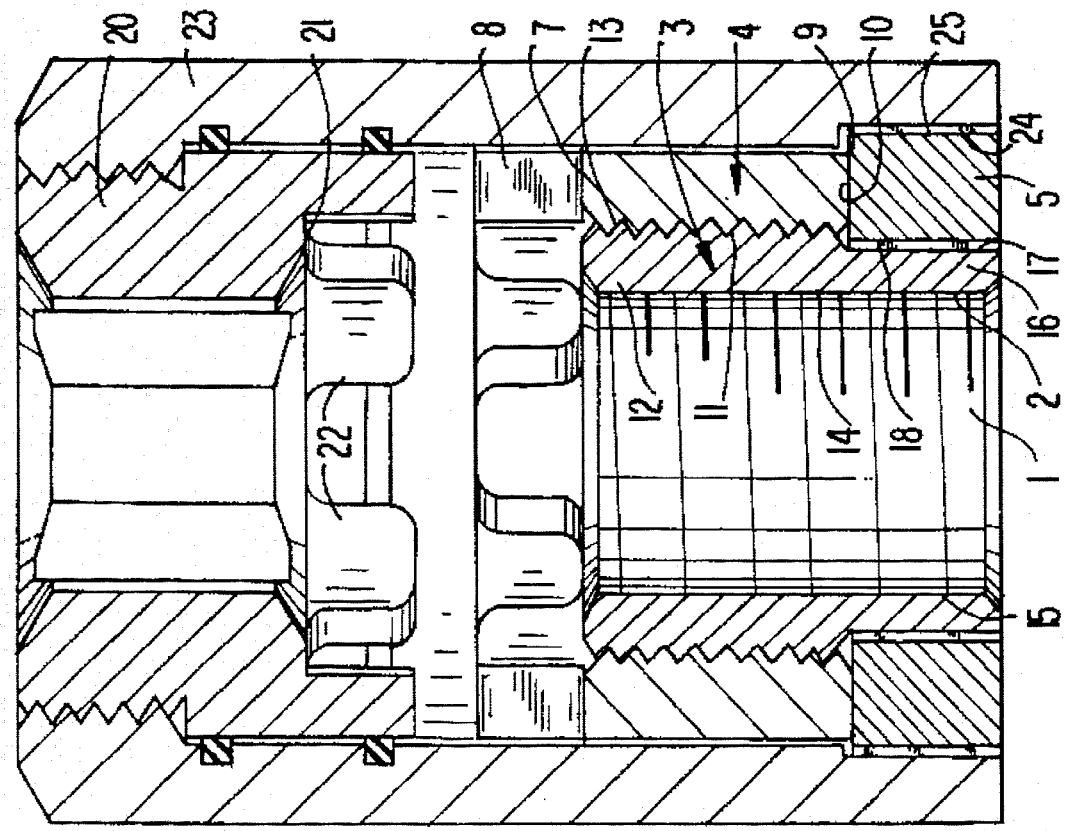

A mechanical tensioner in accordance with the present invention is used for elongating and relaxing a stud 1 which is arranged in an outside object such as a flange 2 and the like. The mechanical tensioner has an inner or first part which is identified as a whole with reference numeral 3, an outer or a second part which is identified as a whole with reference numeral 4, and a friction element which is identified as a whole with reference numeral 5 and located between the inner and outer parts.

The outer part has an end face 7 provided with engaging formations, for example teeth 8, to be engaged by a tool. The outer part 4 also has a surface 9 which faces toward the flange 2 and is arranged to abut against a facing surface 10 of the friction element 5. Finally, the outer part 4 has an inner thread 11.

The inner part 3 has a first cylindrical portion 12 which is distant from the flange 2 and has an outer surface provided with a thread 13 engageable with a thread 11 of the outer part 4. The inner part 3 also has a thread 14 engageable with a thread 15 of the socket 1. Finally, the inner part 3 has a second axial portion 16 which is polygonal and in the shown example is provided with outer splines 17. The inner part and the outer part are formed as tubular members.

The friction element 5 is ring-shaped. It is located between the end portion 9 of the outer part 4 and the flange 2 on the one hand and surrounds the portion 14 of the inner part 3 on the other hand. The friction element 5 has an inner surface provided with a plurality of engaging formations 18 which are formed for example as splines engageable with the splines 17 of the portion 16 of the inner part 3.

It can be seen that the inner part 3 has four surfaces cooperating with other parts of the mechanical tensioner and subjectable to friction. In particular, it has the surface of the outer thread 13, the surface of the inner thread 14, the end surface abutting against the friction element 5, and the end surface abutting against the flange 2. In contrast, the outer part 4 has only two surfaces which are subjectable to friction, namely the surface of the inner thread 11 and the surface 9 abutting against the surface 10 of the friction element 5.

An inner socket 20 has an end face 21 which is provided with a plurality of teeth 22 engageable with the teeth 8 of the outer part 4. An outer socket 23 is turnable relative to the inner socket 20 and has a lower portion with an inner peripheral surface provided with inner splines 24. The splines 24 of the outer socket 23 are engageable with splines 25 provided on an outer peripheral surface of the friction element 5.

The inner socket 20 is connectable with a rotatable and axially displaceable part of a power tool, while the outer socket 23 can be connectable with an immovable part of a power tool.

During operation the outer non-rotatable socket 23 holds the friction element 5 non-rotatably by inter-engagement of the splines 24, 25 so as to apply a holding force to the friction element 5. The inner socket 20 is lowered so that its teeth 22 engage with the teeth 8 of the second part 4, and an active rotary force is applied to the socket 20 and thereby to the outer part 4. The outer part 4 is rotated relative to the inner part 3, the inner part 3 moves axially upwardly (due to the cooperation of the threads 11, 13), and the inner part 3 pulls the stud 1 upwardly (due to the cooperation of the threads 14, 15) without turning the stud relative to its axis, so that the stud 1 is elongated. Turning of the socket 20 in an opposite direction results in turning of the outer part 4 in the opposite direction and thereby moving the stud in an opposite axial direction so as to relax the stud.

Due to the inventive cooperation of the parts 3 and 4 and the friction element 5 which imparts a higher friction to the inner part 3, when the above mentioned active force is applied to the outer part 4 in a transverse direction, after elimination of the gaps in the assembly, the outer part 4 moves in the transverse direction to the axis (rotates) while the inner part 3 moves only in the axial direction to pull the stud in the axial direction.

It will be understood that each of the elements described above, or two or more together, may also find a useful application in other types of constructions and methods differing from the types described above.

While the invention has been illustrated and described as embodied in a mechanical tensioner for and method of elongating and relaxing a stud and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mechanical tensioner for elongating and relaxing a stud having an axis and arranged in an object, comprising at least two parts including a first part connectable with a stud to pull the stud in an axial direction so as to elongate the stud and thereby to tension it in an object or to relax the stud; a second part connected with said first part movably in a transverse direction relative to said first part; and a friction element cooperating with said first part and said second part and connected with said first part immovably in a transverse direction relative to said first part, said second part having first engaging means engageable by a tool, while said friction element has second engaging means engageable by a tool so that when an active force is applied to said second part through said first engaging means and an opposite holding force is applied to said friction element through said second engaging means said second part moves in the transverse direction relative to said first part and said first part moves only in an axial direction relative to said second part so as to elongate or to relax the stud.

2. A mechanical tensioner as defined in claim 1, wherein said first part has a first cylindrical axial portion provided with a first thread, said second part being provided with a second thread engaging with said first thread so that said second part is turnable relative to said first part.

3. A mechanical tensioner as defined in claim 2, wherein said first part has a second axial portion which is polygonal, said friction element being connected with said polygonal axial portion of said first part non-rotatably relative to said first part.

4. A mechanical tensioner as defined in claim 1; and further comprising an inner socket provided with first engaging formations engageable with said first engaging means of said second part; and an outer socket rotatable relative to said first socket and provided with second engaging formations engageable with said second engaging means of said friction element.

5. A mechanical tensioner as defined in claim 4, wherein said first engaging formations of said second part are provided on an end face of said second part, while said first engaging formations of said first socket are provided on an opposite end face of said first socket, said second engaging means of said friction element being provided on an outer peripheral surface of said friction element, while said second engaging formations of said second socket are provided on an inner peripheral surface of said second socket.

6. A method of elongating and relaxing a stud having an axis and arranged in an object, comprising the steps of connecting a first part with the stud to pull the stud in an axial direction so as to elongate the stud and thereby to tension it in the object and to relax the stud; connecting a second part with the first part so that the second part is movable in a transverse direction relative to the first part; arranging a friction element between the first part and the second part; providing on the second part first engaging means engageable by a tool; providing on the friction element second engaging means engageable by a tool; applying an active force to the second part through the first engaging means, and applying an opposite holding force to the friction element through the second engaging means so that the second part moves in the transverse direction while the first part moves only in an axial direction so as to elongate or to relax the stud.

7. A method as defined in claim 6, wherein said connecting step of the second part with the first part includes providing on a first cylindrical axial portion of the first part a first thread and providing on the second part a second thread engageable with the first thread so that the second part is turnable relative to the first part.

8. A method as defined in claim 7, wherein said connecting step of the friction element with the first part includes providing on the first part a second axial portion which is polygonal, and connecting the friction element with polygonal portion of the first part so that the friction element is non-rotatable relative to the first part.

9. A method as defined in claim 6, wherein said engaging step includes engaging the second part by an inner socket of the tool, and engaging the friction element by an outer socket of the tool which outer socket is rotatable relative to the inner socket.

10. A method as defined in claim 9, wherein said engaging step includes engaging the second part by the inner socket includes providing on an axial end face of the second part first engaging means, providing on an opposite axial end face of the inner socket first engaging formations, and engaging the first engaging means of the second part by the first engaging formations of the inner socket, said engaging the friction element by the outer socket including providing on an outer peripheral surface of the friction element second engaging means, providing on an inner peripheral surface of the outer socket second engaging formations, and engaging the second engaging means of the friction element by the second engaging formations of the second socket.

* * * * *